United States Patent
Kikuchi et al.

(10) Patent No.: US 9,999,060 B2
(45) Date of Patent: Jun. 12, 2018

(54) RADIO CONTROL SYSTEM, COMMUNICATION APPARATUS, RADIO RESOURCE CONTROL METHOD, AND RECORDING MEDIUM

(71) Applicant: NEC Corporation, Tokyo (JP)

(72) Inventors: Tooru Kikuchi, Tokyo (JP); Yasuhiko Matsunaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 14/904,444

(22) PCT Filed: Jul. 14, 2014

(86) PCT No.: PCT/JP2014/003716
§ 371 (c)(1),
(2) Date: Jan. 12, 2016

(87) PCT Pub. No.: WO2015/008475
PCT Pub. Date: Jan. 22, 2015

(65) Prior Publication Data
US 2016/0198481 A1    Jul. 7, 2016

(30) Foreign Application Priority Data
Jul. 17, 2013   (JP) ................................ 2013-148546

(51) Int. Cl.
*H04W 72/00* (2009.01)
*H04W 72/08* (2009.01)
(Continued)

(52) U.S. Cl.
CPC ......... *H04W 72/085* (2013.01); *H04W 16/06* (2013.01); *H04W 16/32* (2013.01)

(58) Field of Classification Search
None
See application file for complete search history.

(56) References Cited

U.S. PATENT DOCUMENTS 6,941,347 B2   9/2005   Yoshimura
8,811,286 B2   8/2014   Yamamoto et al.
(Continued)

FOREIGN PATENT DOCUMENTS

JP   2001-339335   12/2001
JP   2010-130494    6/2010
(Continued)

OTHER PUBLICATIONS

Korean Office Action dated Nov. 18, 2016 in corresponding Korean Patent Application No. 2016-7003977 with partial English translation of Korean Office Action.
(Continued)

*Primary Examiner* — Erika Washington
(74) *Attorney, Agent, or Firm* — Young & Thompson

(57) ABSTRACT

A radio control system capable of avoiding decrease in a throughput of a macro base station and a micro base station or suppress interference in the micro base station is provided. The radio control system includes a macro base station 101 forming a macro cell 103 and a micro base station 102 forming a picocell 105 included in the macro cell 103. Further, the radio control system includes a communication quality detection unit 111 detecting a communication quality between the micro base station 102 and a communication terminal present in the picocell 105, and a management apparatus 110 controlling a ratio of a radio resource where data transmission is limited in the first base station, based on the communication quality.

20 Claims, 15 Drawing Sheets

(51) Int. Cl.
*H04W 16/06* (2009.01)
*H04W 16/32* (2009.01)

(56) References Cited

U.S. PATENT DOCUMENTS

| | | | |
|---|---|---|---|
| 9,060,377 | B2 | 6/2015 | Gao et al. |
| 9,331,824 | B2 | 5/2016 | Maniatis et al. |
| 2010/0240387 | A1 | 9/2010 | Ezaki |
| 2013/0107798 | A1 | 5/2013 | Gao et al. |
| 2013/0114446 | A1* | 5/2013 | Liu ................. H04W 24/10 370/252 |
| 2013/0315157 | A1* | 11/2013 | Krishnamurthy ..... H04L 5/0053 370/329 |
| 2013/0315191 | A1 | 11/2013 | Yoshimoto et al. |
| 2013/0343214 | A1 | 12/2013 | Yamamoto et al. |
| 2014/0023009 | A1 | 1/2014 | Abe et al. |

FOREIGN PATENT DOCUMENTS

| | | |
|---|---|---|
| JP | 2010-233202 | 10/2010 |
| JP | 2012-129793 | 7/2012 |
| JP | 2012-169738 | 9/2012 |
| JP | 2012-175272 | 9/2012 |
| JP | 2012-235375 | 11/2012 |
| JP | 2013-98989 | 5/2013 |
| KR | 10-2013-0063658 | 6/2013 |
| WO | WO 2009/081457 | 7/2009 |
| WO | WO 2012/096049 | 7/2012 |
| WO | WO 2012/132187 | 10/2012 |
| WO | WO 2013/021723 | 2/2013 |
| WO | 2013-075742 | 5/2013 |

OTHER PUBLICATIONS

European Searh Report—EP 14 82 6837—dated Feb. 14, 2017.
Al-Rawi Mohammed et al.: "Utility-based resource allocation in LTE-Advanced heterogeneous networks", 2013 9th International Wireless Communications and Mobile Computing Conference (IWCMC), IEEE, Jul. 1, 2013 (Jul. 1, 2013), pp. 826-830, XP032478724, D0I: 10.1109/IWCMC.2013.6583664 ISBN: 978-1-4673-2479-3 [retrieved on Aug. 20, 2013] *page26, right-hand column, paragraph 3* Equations (2)-(4) and following paragraph* *Equation (6) * *figure 1*.
Naga Sekhar Kshatriya S et al.: "A novel power control scheme for macro-pico heterogeneous networks with biased association", 2013 IEEE International Conference on Communications Workshops (ICC), IEEE, Jun. 9, 2013 (Jun. 9, 2013), pp. 1117-1122, XP032518697, D01: 10.1109/ICCW.2013.6649404 [retrieved on Oct. 28, 2013 ] *p. 1118, right-hand column, paragraph 1*.
Japanese Official Action—2015-527175—dated Jan. 17, 2017.
International Search Report, PCT/JP2014/003716, dated Sep. 2, 2014.
Japanese Official Action—2015-527175—dated Apr. 18, 2017.
European Official Action , 14 826 837.8-1505, dated Oct. 26, 2017.
European Summons to Attend Oral Proceedings dated Mar. 21, 2018 in corresponding European Patent Application No. 14826837.8.
Anonymous: "ShareTechnote", Apr. 23, 2013, XP055459279, Retrieved from the Internet: URL:https://web.archive.org/web/20130423053321/http://www.sharetechnote.com/html/Handbook_LTE_RadioLinkFailure.html [retrieved on Mar. 14, 2018].

* cited by examiner

Fig.4

| #0 | #1 | #2 | #3 | #4 | #5 | #6 | #7 | ... | #32 | #33 | #34 | #35 | #36 | #37 | #38 | #39 |
|----|----|----|----|----|----|----|----|-----|-----|-----|-----|-----|-----|-----|-----|-----|
| ABS |   |   |   |   |   |   |   |     | ABS |     |     |     |     |     |     |     |

Fig.5

| #0 | #1 | #2 | #3 | #4 | #5 | #6 | #7 | ... | #32 | #33 | #34 | #35 | #36 | #37 | #38 | #39 |
|----|----|----|----|----|----|----|----|-----|-----|-----|-----|-----|-----|-----|-----|-----|
| ABS |   |   |   | ABS |   |   |   |     | ABS |     |     |     | ABS |     |     |     |

Fig.8

|  | ABS RATIO |
|---|---|
| #1 | 1/8 |
| #2 | 2/8 |
| #3 | 3/8 |
| . . | . . |
| #N | N/8 |

Fig.9

| #1 | ABS RATIO INCREASE DETERMINATION THRESHOLD VALUE 1 |
|---|---|
| #2 | ABS RATIO INCREASE DETERMINATION THRESHOLD VALUE 2 |
| #3 | ABS RATIO INCREASE DETERMINATION THRESHOLD VALUE 3 |
| ⋮ | ⋮ |
| #N | ABS RATIO INCREASE DETERMINATION THRESHOLD VALUE N |

Fig.11

| #1 | ABS RATIO DECREASE DETERMINATION THRESHOLD VALUE 1 |
|---|---|
| #2 | ABS RATIO DECREASE DETERMINATION THRESHOLD VALUE 2 |
| #3 | ABS RATIO DECREASE DETERMINATION THRESHOLD VALUE 3 |
| ⋮ | ⋮ |
| #N | ABS RATIO DECREASE DETERMINATION THRESHOLD VALUE N |

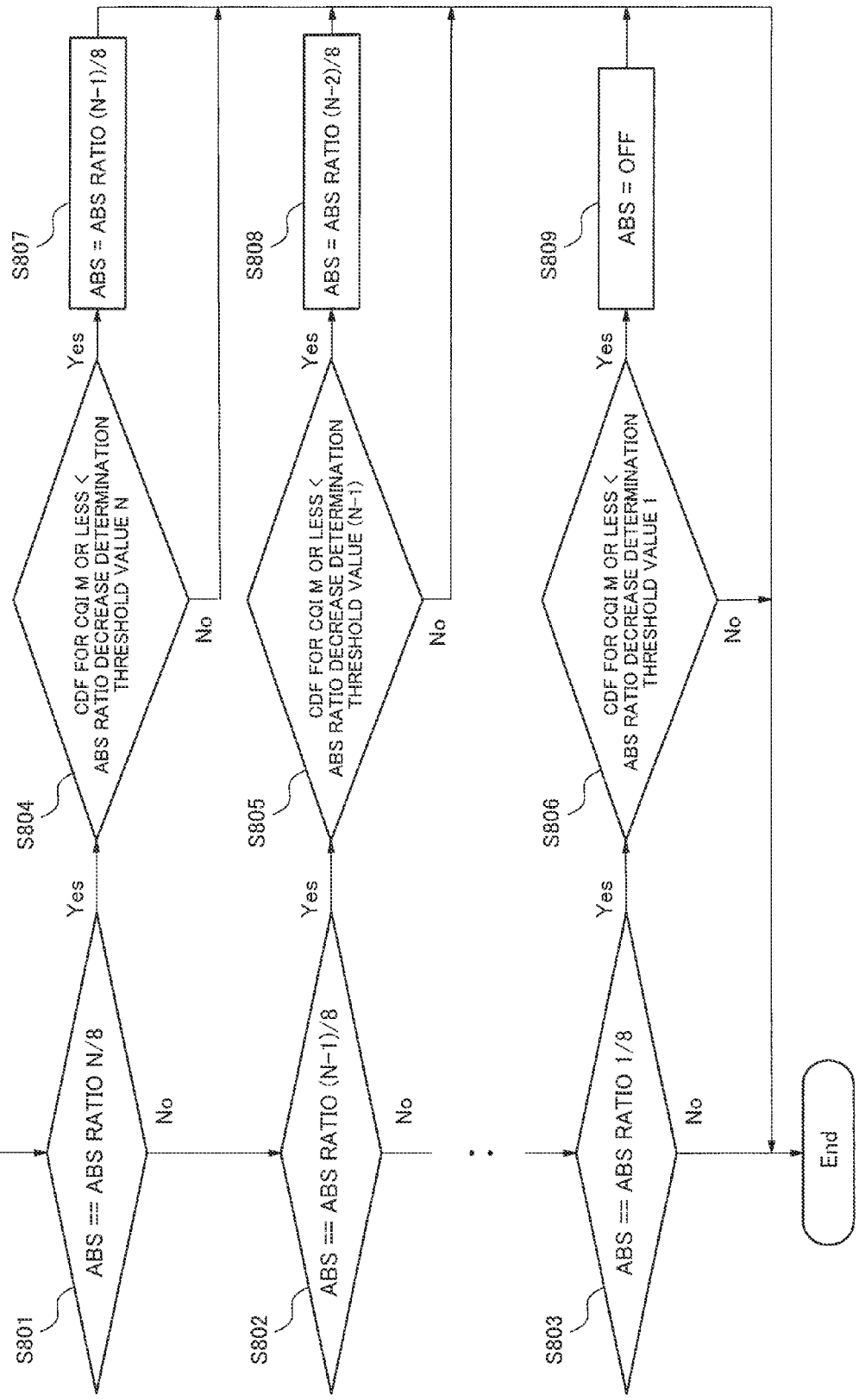

RADIO CONTROL SYSTEM, COMMUNICATION APPARATUS, RADIO RESOURCE CONTROL METHOD, AND RECORDING MEDIUM

TECHNICAL FIELD

The disclosure of the present description relates to a radio control system, a communication apparatus, a radio resource control method, and a recording medium.

BACKGROUND ART

For example, in order to improve the system throughput and the user capacity in a service area in a LTE (Long Term Evolution) system, the use of HetNet (Heterogeneous Network) is considered. In the HetNet, micro base stations are arranged in such a manner as to be overlaid in a coverage of a macro base station. Further, by using the HetNet, a communication terminal communicating with a macro base station can be off-loaded to a micro base station. Therefore, by using the HetNet, the system throughput and the like can be improved.

In the HetNet environment, the coverage of the micro base station can be expanded by using CRE (Cell Range Expansion). More specifically, by using the CRE, a communication terminal adds an offset to a reception power of a signal transmitted from a micro base station. Accordingly, the area in which the communication terminal can connect to the micro base station is expanded, and as a result, the coverage of the micro base station is expanded. At this occasion, in particular, there is a problem in that a communication terminal located in an area expanded by CRE is affected by a higher level of interference caused by a signal transmitted from the macro base station. Therefore, in order to avoid the interference, an ABS (Almost Blank Subframe) which is a particular sub frame for controlling data transmission from the macro base station is used. For example, PTLs 1 and 2 disclose a configuration of a mobile communication network in which the interference caused by a signal transmitted from a macro base station is reduced in a micro base station by using ABS.

CITATION LIST

Patent Literature

[PTL 1] International Publication No. 2013/021723
[PTL 2] International Publication No. 2012/132187

SUMMARY OF INVENTION

Technical Problem

However, in a case where the mobile communication network disclosed in PTLs 1 and 2 is used, the macro base station cannot perform data transmission in a sub frame in which ABS is set. Therefore, in a case where there are too many frames in which ABS is set, there is a problem in that the throughput of the macro base station is reduced. On the other hand, in a case where there are only a few frames in which ABS is set, there is a problem in that the interference caused in the micro base station cannot be completely eliminated, and the throughput of the micro base station is reduced.

It is an object of an exemplary embodiment of the present invention to provide a radio control system, a communication apparatus, a radio resource control method, and a recording medium capable of avoiding decrease in a throughput of a macro base station and a micro base station or suppress interference in the micro base station. It should be noted that this object is merely one of multiple objects which are to be achieved by exemplary embodiments disclosed in the present description. The other objects or problems and new features are clarified from the description or appended drawings of the present description.

Solution to Problem

A radio control system according to an exemplary embodiment includes a first base station forming a first communication area, a second base station forming a second communication area included in the first communication area, a detection unit detecting a communication quality between the second base station and a communication terminal present in the second communication area, and a control unit controlling a ratio of a radio resource where data transmission is limited in the first base station, on the basis of the communication quality.

A communication apparatus according to an exemplary embodiment includes a control unit controlling a ratio of a radio resource where data transmission is limited in a first base station, on the basis of a communication quality with a communication terminal present in a second communication area included in a first communication area formed by the first base station.

A radio resource control method according to an exemplary embodiment controls a ratio of a radio resource where data transmission is limited in a first base station, on the basis of a communication quality with a communication terminal present in a second communication area included in a first communication area formed by the first base station.

A recording medium according to an exemplary embodiment records a program for causing a computer to execute process for controlling a ratio of a radio resource where data transmission is limited in a first base station, on the basis of a communication quality with a communication terminal present in a second communication area included in a first communication area formed by the first base station.

Advantageous Effects of Invention

According to an exemplary embodiment of the present invention, a radio control system, a communication apparatus, a radio resource control method, and a recording medium capable of avoiding decrease in a throughput of a macro base station and a micro base station or suppress interference in the micro base station can be provided.

BRIEF DESCRIPTION OF DRAWINGS

FIG. 4 is a figure for explaining a configuration of a sub frame according to the second exemplary embodiment.
FIG. 5 is a figure for explaining a configuration of a sub frame according to the second exemplary embodiment.

FIG. 8 is a figure illustrating an ABS ratio management table according to the second exemplary embodiment.

FIG. 9 is a figure illustrating a threshold value management table according to the second exemplary embodiment.

FIG. 11 is a figure illustrating a threshold value management table according to the second exemplary embodiment.

FIG. 16 is a figure for explaining a flow of ABS ratio decrease processing according to the third exemplary embodiment.

DESCRIPTION OF EMBODIMENTS

Figure 1:
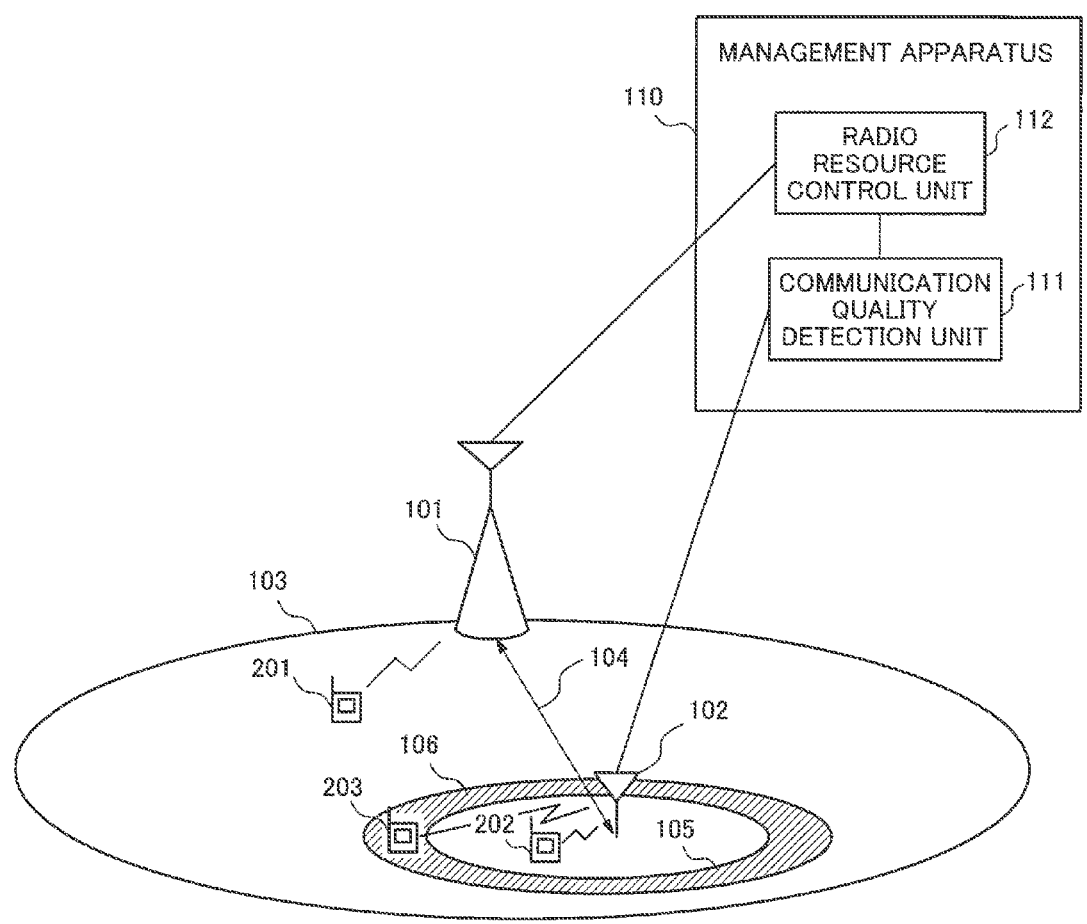
FIG. 1 is a configuration diagram illustrating a radio control system according to a first exemplary embodiment.

Hereinafter, specific exemplary embodiments will be explained in details with reference to drawings. In each of the drawings, the same elements or corresponding elements are denoted with the same reference numerals, and for the sake of clarification of the explanation, repeated explanation is omitted as necessary.

Multiple exemplary embodiments explained below can be carried out independently, or can be carried out by combining multiple exemplary embodiments as necessary. These multiple exemplary embodiments have new features different from each other. Therefore, these multiple exemplary embodiments contribute to achieving objects or solving problems different from each other, and contribute to achieving the effects different from each other.

(First Exemplary Embodiment)

An example of a configuration of a radio control system according to the first exemplary embodiment will be explained with reference to FIG. 1. The radio control system of FIG. 1 includes a macro base station 101 and a micro base station 102. The macro base station 101 forms a macro cell 103. The micro base station 102 forms a picocell 105. Further, by using CRE, the micro base station 102 can expand the picocell 105 to an expansion area 106. The radio control system of FIG. 1 illustrates a HetNet environment, the picocell 105 is arranged in such a manner as to be overlaid in the macro cell 103. More specifically, the picocell 105 and the expansion area 106 are formed to be included in the macro cell 103. The micro base station may be referred to as a femto-base station, and further, the picocell 105 may be referred to as a micro cell, a femtocell, and the like. Further, the macro base station 101 communicates with the communication terminal 201, and the micro base station 102 communicates with the communication terminals 202 and 203 in the picocell 105 or the expansion area 106. This drawing illustrates an example of a configuration in which there is one communication terminal present in each of the macro cell 103, the picocell 105, and the expansion cell 106, but there may be multiple communication terminals present in each of the macro cell 103, the picocell 105, and the expansion cell 106.

The macro base station 101 and the micro base station 102 are connected via the communication interface 104. The macro base station 101 and the micro base station 102 transmits and receives RLF (Radio Link Failure) information indicating radio link failure between each of the base stations and the communication terminals, ABS information, and the like.

Further, the radio control system may have a management apparatus 110. The management apparatus 110 may be a base station control apparatus, a gateway apparatus, or the like which is a host apparatus for the macro base station 101 and the micro base station 102. Alternatively, the management apparatus 110 may be an EMS (Element Management System) for managing the macro base station 101 and the micro base station 102. The management apparatus 110 includes a communication quality detection unit 111 and a radio resource control unit 112. In this case, this drawing indicates a configuration in which the management apparatus 110 includes the communication quality detection unit 111 and the radio resource control unit 112, but other apparatuses may include the communication quality detection unit 111 and the radio resource control unit 112. For example, the micro base station 102 may include a communication quality detection unit 111, the macro base station 101 may include a radio resource control unit 112.

The communication quality detection unit 111 detects a communication quality between the micro base station 102 and the communication terminals 202, 203 present in the picocell 105 or the expansion area 106. The communication quality detected by the communication quality detection unit 111 may be an RLF indicating radio link failure between the micro base station 102 and the communication terminal 202 present in the picocell 105, or between the micro base station 102 and the communication terminal 203 present in the expansion area 106. Further, the communication quality detected by the communication quality detection unit 111 may be CQI (Channel Quality Indicator) distribution, SINR (Signal to Interference and Noise power Ratio) value, MCS (Modulation and Coding Scheme) distribution, or the like.

The radio resource control unit 112 controls limitation of the usage of the radio resource of the macro base station 101 on the basis of the communication quality detected by the communication quality detection unit 111. The radio resource where usage is limited indicates, for example, a radio resource used in the radio communication between the communication terminal 201 and the macro base station 101. The control of the limitation of the usage of the radio resource in the macro base station 101 may be done, for example, by controlling the pattern of ABS. The macro base station 101 uses the ABS so as to avoid interference caused by a signal transmitted from the macro base station 101 against the communication terminals 202, 203 present in the picocell 105 or the expansion area 106. Therefore, since the interference of the sub frame corresponding to ABS is reduced, the micro base station 102 can improve the throughput of the sub frame corresponding to ABS. The communication terminal 201 communicates with the macro base station 101 by using sub frames other than the sub frames corresponding to ABS in accordance with the pattern of the ABS controlled by the radio resource control unit 112.

The radio resource control unit 112 controls the ratio of the radio resource where its usage is limited, and more specifically, the radio resource control unit 112 controls the ratio for setting ABS. For example, in a case where radio resource control unit 112 sets a high ratio for setting ABS, the interference against the communication terminals 202, 203 present in the picocell 105 or the expansion area 106 can be reduced, but the throughput of the macro base station 101 decreases.

On the other hand, in a case where the radio resource control unit 112 sets a low ratio for setting ABS, the throughput of the macro base station 101 is improved, but the interference against the communication terminals 202, 203 present in the picocell 105 or the expansion area 106 is increased.

The radio resource control unit 112 uses the communication quality detected by the radio resource control unit 112 to control the ratio of the radio resource where its usage is limited in view of the throughput of the macro base station 101 and the interference caused by the signal transmitted from the macro base station 101 against the picocell 105 or the expansion area 106.

As explained above, by using the radio control system according to FIG. 1, the communication quality detection unit 111 can detect the communication quality between the micro base station 102 and the communication terminal 202 present in the picocell 105 or between the micro base station 102 and the communication terminal 203 present in the expansion area 106. Further, the radio resource control unit 112 can control the ratio of the radio resource where its usage is limited in the macro base station 101 in accordance with the communication quality. Therefore, by using the detected communication quality, the radio resource control unit 112 can control the ratio of the radio resource where its usage is limited so as to optimize the throughput of the macro base station 101 and the interference caused by the signal transmitted from the macro base station 101 against the picocell 105 or the expansion area 106.

(Second Exemplary Embodiment)

Figure 2:
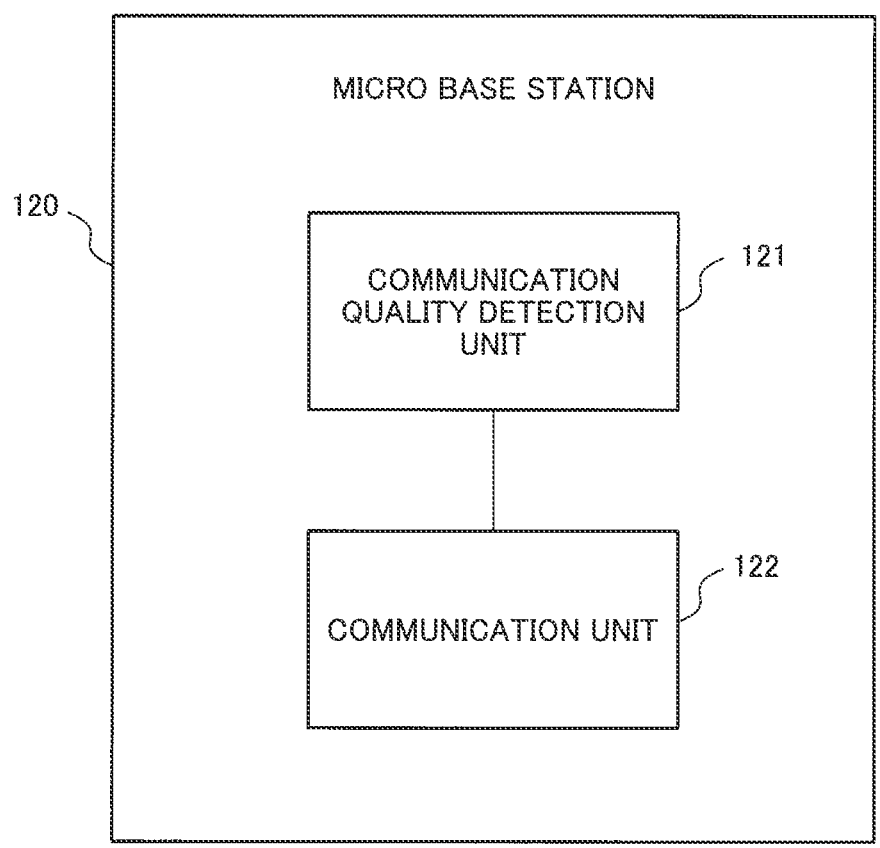
FIG. 2 is a configuration diagram illustrating a micro base station according to a second exemplary embodiment.

Subsequently, an example of a configuration of a micro base station 120 according to the second exemplary embodiment will be explained with reference to FIG. 2. The micro base station 120 includes a communication quality detection unit 121 and a communication unit 122. In FIG. 1, the configuration in which the communication quality detection unit 111 is provided on the management apparatus which is different from the micro base station 102 has been explained, but in this drawing, a configuration in which the micro base station 120 includes the communication quality detection unit 121 will be explained. Like FIG. 1, the micro base station 120 forms a picocell 105 and an expansion area 106.

The communication quality detection unit 121 detects the communication quality with a communication terminal present in the picocell 105 or the expansion area 106. In the following explanation, the number of RLFs will be used in the explanation as a specific example of a communication quality. The communication quality detection unit 121 detects the number of RLFs that occurred in a communication terminal present in the picocell 105 or the expansion area 106. It should be noted that the number of RLFs may also be the number of occurrence of RLFs (the number of detections) or the number of call disconnections.

A communication terminal present in the picocell 105 or the expansion area 106 is connected to the micro base station 120. The connection means a state in which, for example, the communication terminal can communicate with the micro base station 120. The communication quality detection unit 121 detects the number of RLFs of each of the communication terminals connected with the micro base station 120 for a certain period of time. Further, the communication quality detection unit 121 generates statistics information by summarizing the number of RLFs detected for each communication terminal. The statistics information indicates the number of RLFs that occurred in a certain period of time in all the communication terminals connected with the micro base station 120. The communication quality detection unit 121 outputs the statistics information about the number of RLFs that has been detected to the communication unit 122.

The communication unit 122 transmits the statistics information about the number of RLFs via the communication interface 104 to the macro base station 130. For example, the communication interface 104 uses X2 interface defined as an interface between base stations in 3GPP (3rd Generation Partnership Project).

Figure 3:
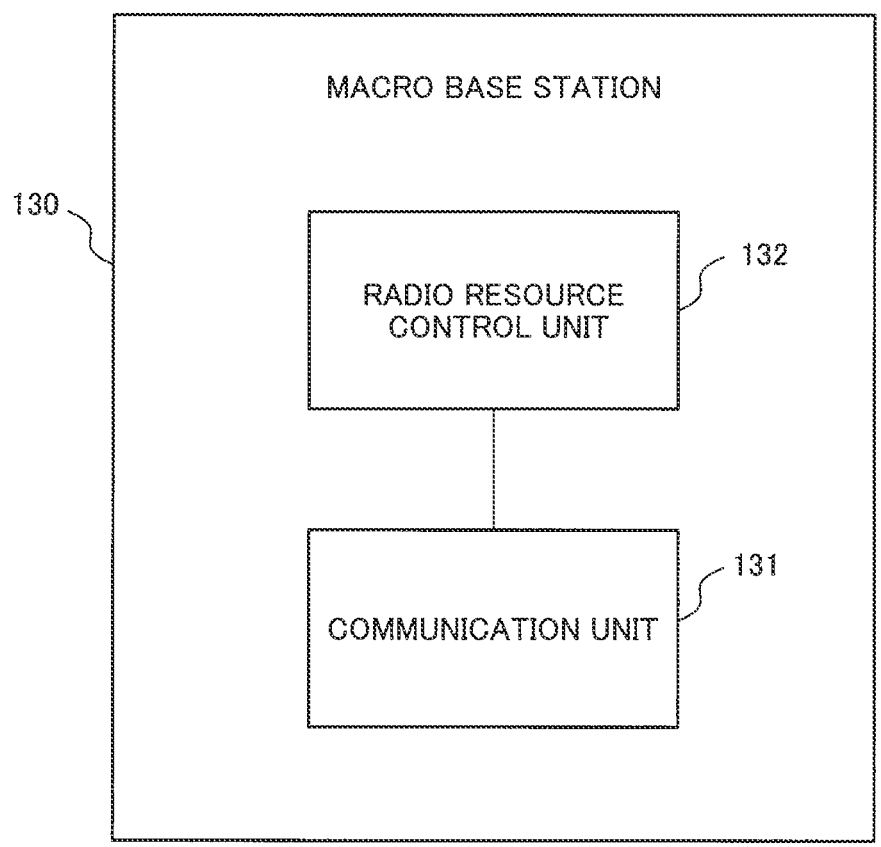
FIG. 3 is a figure illustrating a macro base station according to the second exemplary embodiment.

Subsequently, an example of a configuration of the macro base station 130 according to the second exemplary embodiment will be explained with reference to FIG. 3. The macro base station 130 includes a communication unit 131 and a radio resource control unit 132. In FIG. 1, the configuration in which the radio resource control unit 112 is provided in the management apparatus different from the macro base station 101 has been explained, but in this drawing, a configuration in which a macro base station 130 includes a radio resource control unit 132 will be explained. Like FIG. 1, the macro base station 130 forms a macro cell 103.

The communication unit 131 receives the statistics information about the number of RLFs transmitted from the micro base station 120 via the communication interface 104. The communication unit 131 outputs the statistics information about the number of RLFs that has been received to the radio resource control unit 132.

The radio resource control unit 132 uses the statistics information about the number of RLFs that has been output to calculate the ratio of ABSes that are set in the sub frames hereinafter referred to as an ABS ratio). In this case, the ABS ratio will be explained as a specific example of the ratio of the radio resource where its usage is limited.

In this case, the ABS ratio will be explained with reference to FIGS. 4 and 5. As shown in FIGS. 4 and 5, ABS defined in 3GPP has 40 sub frames in a single cycle, and the setting pattern of ABS that is set in 40 sub frames can be set in any pattern. Symbols #0 to #39 indicate sub frame numbers. The micro base station 120 and the macro base station 130 sets a setting pattern of ABS in broadcast information, and notifies the setting pattern of ABS to each communication terminal.

FIG. 4 illustrates an example where ABSes are set with an interval of eight sub frames. In this case, the ABS ratio is 1/8 with respect to all the sub frames. FIG. 5 illustrates an example where ABSes are set with an interval of four sub frames. In this case, the ABS ratio is 1/4 with respect to all the sub frames.

The communication unit 131 uses the broadcast information to transmit the setting pattern of ABS to the communication terminal present in the macro cell 103.

Subsequently, a flow of detection processing of the number of RLFs in the micro base station 120 according to the second exemplary embodiment will be explained with reference to FIG. 6. First, the communication quality detection unit 121 measures the number of occurrence of RLFs in a certain period of time (S101). For example, the communication quality detection unit 121 may measure the number of RLFs that occurred in a certain period of time for each of the communication terminals present in the picocell 105 or the expansion area 106, and may generate statistics information by summarizing the measured result.

Subsequently, the communication unit 122 transmits the statistics information about the number of RLFs via the X2 interface to the macro base station 130 (S102).

Subsequently, a flow of radio resource control processing in the macro base station 130 according to the second exemplary embodiment will be explained with reference to FIG. 7. First, the radio resource control unit 132 performs increase processing of the ABS processing by using the number of RLFs obtained via the communication unit 131 (S201).

The number of RLFs which the radio resource control unit 132 obtained via the communication unit 131 is the number of RLFs that occurred in the certain period of time in the micro base station 120.

Figure 8:
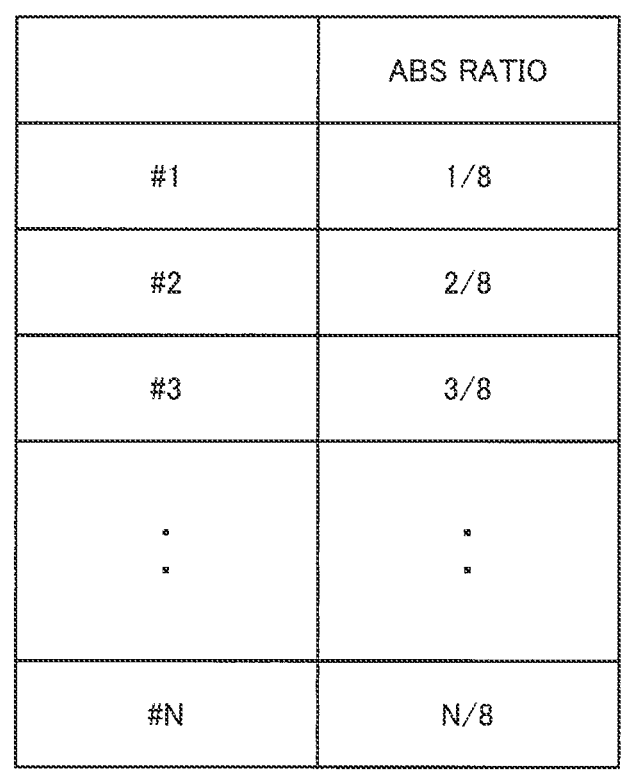
Figure 10:
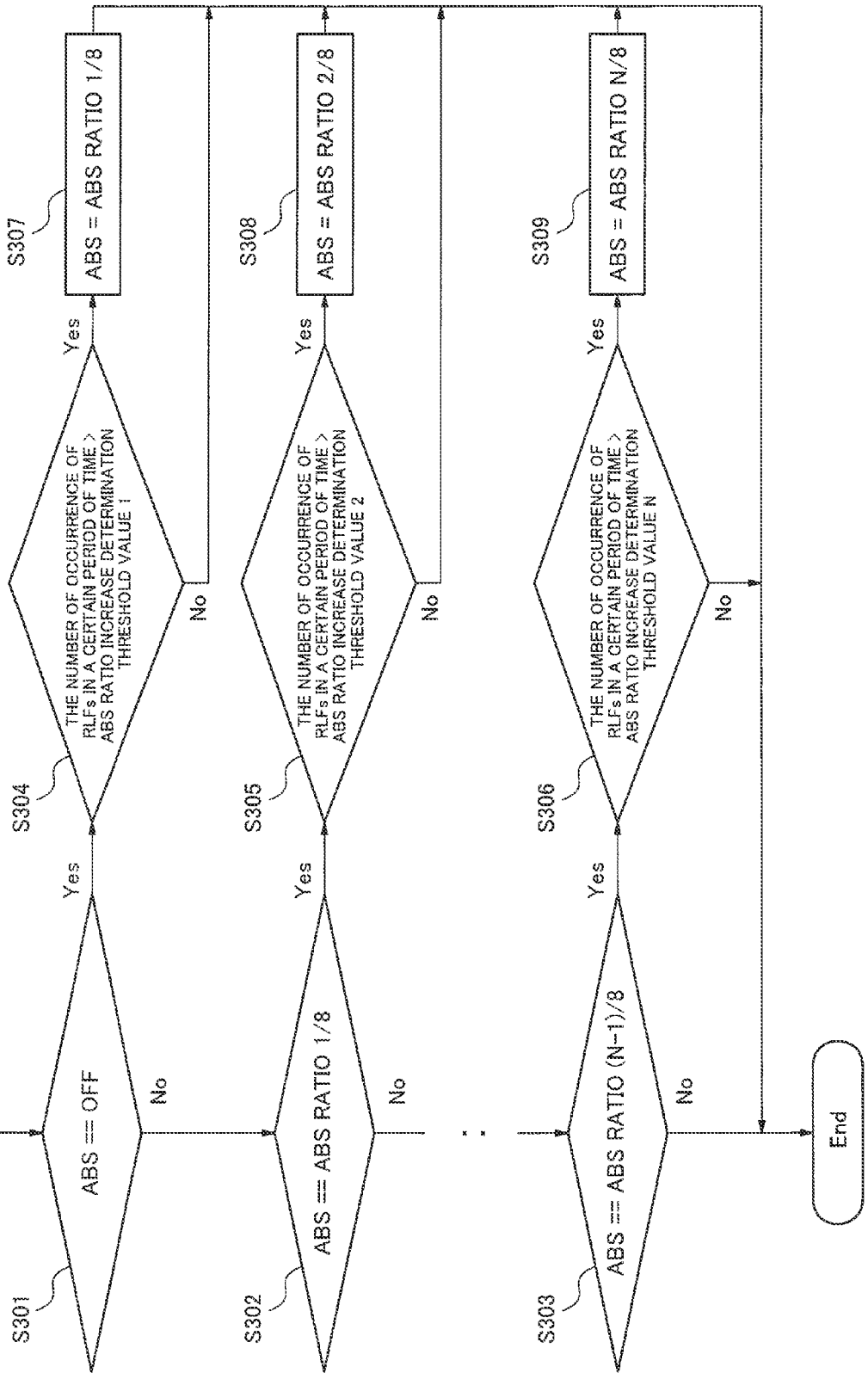
FIG. 10 is a figure for explaining a flow of ABS ratio increase processing according to the second exemplary embodiment.

In this case, increase processing of the ABS ratio in step S201 will be explained in details with reference to FIGS. 8 to 10. The ABS ratio management table of FIG. 8 is a table for managing multiple ABS ratios. For example, in FIG. 8, N values of 1/8 to N/8 (N is a natural number equal to or less than eight) are managed as the candidates of ABS ratio that is to be set. The ABS ratio in the ABS ratio management table of FIG. 8 can be changed. More specifically, the value of the ABS ratio in the ABS ratio management table can be rewritten by an administrator and the like.

The threshold value management table of FIG. 9 is a table for managing the threshold value used to perform increase processing of the ABS ratio. For example, the ABS ratio increase determination threshold value 1 is used to determine whether the ABS ratio is to be changed from 0 to 1/8. The ABS ratio increase determination threshold value 2 is used to determine whether the ABS ratio is to be changed from 1/8 to 2/8. The ABS ratio increase determination threshold value N is used to determine whether the ABS ratio is to be changed from (N−1)/8 to N/8. The value of the threshold value is a specific numerical value for comparison with the number of RLFs. The ABS ratio increase determination threshold value increases as it changes from the ABS ratio increase determination threshold value 1 to the ABS ratio increase determination threshold value N.

Subsequently, the details of increase processing of the ABS ration in step S201 of FIG. 7 will be explained with reference to FIG. 10. First, the radio resource control unit 132 determines whether the ABS is currently applied or not (S301). When the ABS is not currently applied, step S304 is executed, and when the ABS is currently applied, step S302 is executed.

In step S304, the radio resource control unit 132 compares the number of RLFs notified by the micro base station 120 and the "ABS ratio increase determination threshold value 1". When the number of RLFs is more than the ABS ratio increase determination threshold value 1, the radio resource control unit 132 sets the ABS ratio to "ABS ratio 1/8" (S307). When the number of RLFs is not more than the ABS increase determination threshold value 1, the radio resource control unit 132 terminates the processing without applying the ABS.

In step S302, the radio resource control unit 132 determines whether the currently applied ABS ratio is "ABS ratio 1/8" or not. When the currently applied ABS ratio is "ABS ratio 1/8", step S305 is executed. In step S305, like step S304, the radio resource control unit 132 compares the number of RLFs notified by the micro base station 120 and the "ABS ratio increase determination threshold value 2". When the number of RLFs is more than the ABS ratio increase determination threshold value 2, the radio resource control unit 132 sets the ABS ratio to "ABS ratio 2/8" (S308). In a case where the number of RLFs is less than the ABS increase determination threshold value 2, the radio resource control unit 132 terminates the processing without changing the ABS ratio.

When the currently applied ABS ratio is not "ABS ratio 1/8" in step S302, the radio resource control unit 132 likewise performs change determination of the ABS ratio in accordance with the currently applied ABS ratio, and as necessary, the radio resource control unit 132 makes determination up to "ABS ratio (N−1)/8" as shown in step S303. For example, between step 302 and step S303, determination processing may be executed to determine whether the currently applied ABS ratio is "ABS ratio 2/8", "ABS ratio 3/8", "ABS ratio 4/8", "ABS ratio 5/8", "ABS ratio 6/8", "ABS ratio 7/8", "ABS ratio 8/8" or not.

In step S303, the radio resource control unit 132 determines the currently applied ABS ratio is "ABS ratio (N−1)/8" or not. When the currently applied ABS ratio is "ABS ratio (N−1)/8", step S306 is executed. When the currently applied ABS ratio is not "ABS ratio (N−1)/8" (i.e., "ABS ratio N/8"), the change determination of ABS is not performed, and the processing is terminated. In step S306, like steps S304 and S305, the radio resource control unit 132 compares the number of RLFs notified by the micro base station 120 and the "ABS ratio increase determination threshold value N", and when the number of RLFs is more than the ABS ratio increase determination threshold value N, the ABS ratio is set to "ABS ratio N/8" (S309). In a case where the number of RLFs is less than the ABS increase determination threshold value N, the radio resource control unit 132 terminates the processing without changing the ABS ratio.

Figure 7:
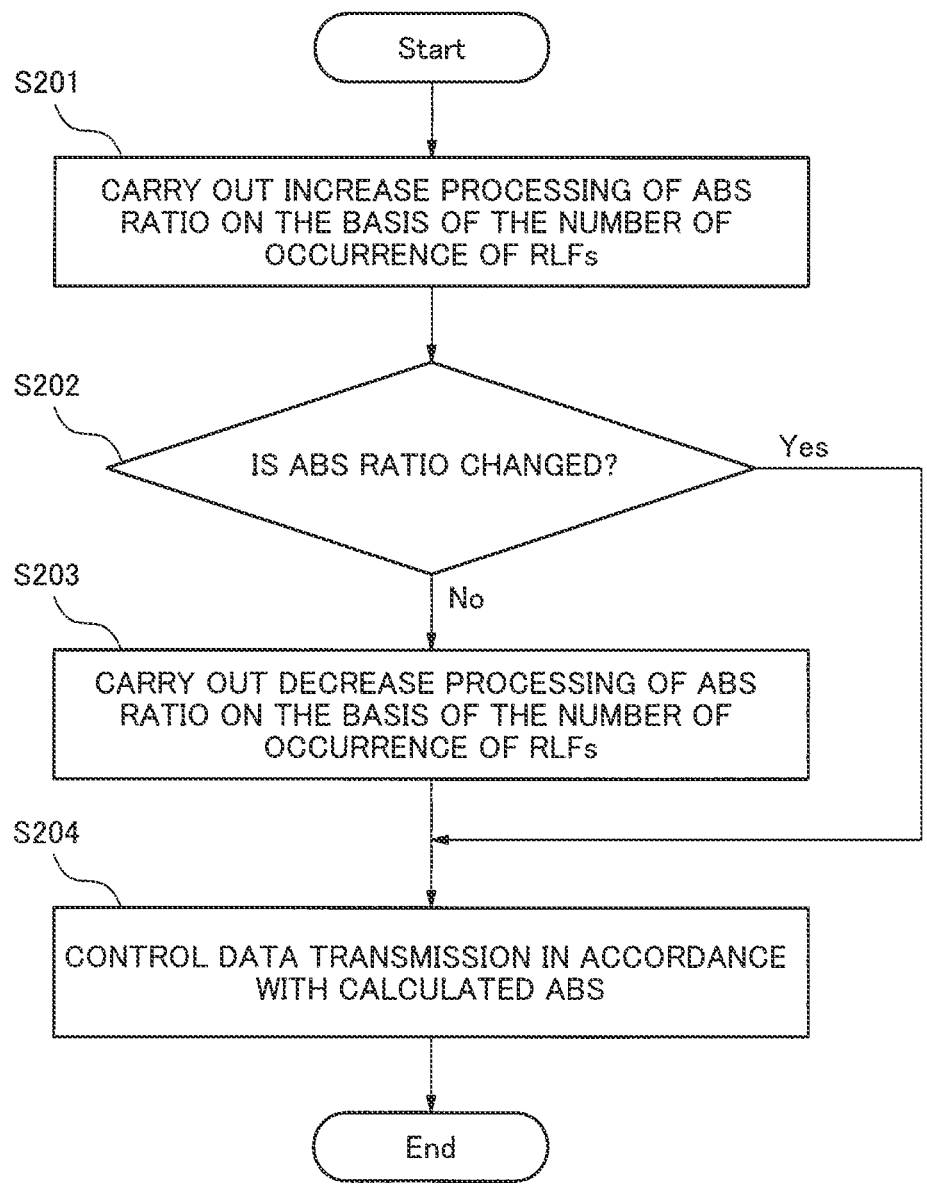
FIG. 7 is a figure for explaining a flow of control processing of a radio resource according to the second exemplary embodiment.

Back to FIG. 7, the radio resource control unit 132 carries out the increase processing of the ABS ratio in step S201, and thereafter, the radio resource control unit 132 determines whether the ABS ratio is changed or not in step S201. In a case where the ABS ratio is changed, the radio resource control unit 132 proceeds to step S204. In a case where the ABS ratio is not changed, the radio resource control unit 132 proceeds to step S203. In step S203, the decrease processing of the ABS ratio is performed.

Figure 12:
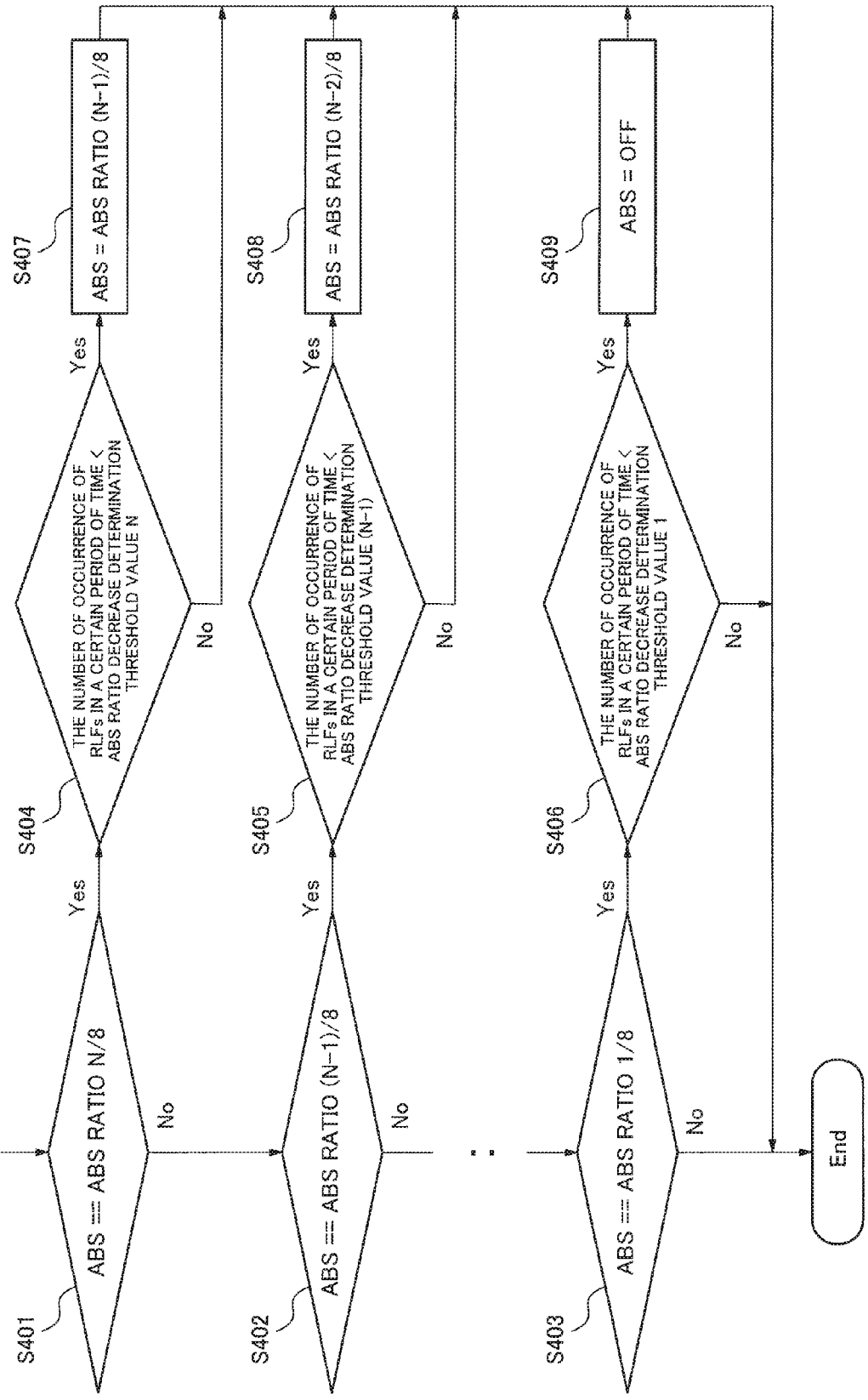
FIG. 12 is a figure for explaining a flow of ABS ratio decrease processing according to the second exemplary embodiment.

Hereinafter, the decrease processing of the ABS ratio in step S203 will be explained in details with reference to FIGS. 11 and 12.

The threshold value management table of FIG. 11 is a table for managing the threshold value used for performing the decrease processing of the ABS ratio. For example, the ABS ratio decrease determination threshold value 1 is used to determine whether the ABS ratio is to be changed from 1/8 to 0. The ABS ratio decrease determination threshold value 2 is used to determine whether the ABS ratio is to be changed from 2/8 to 1/8. The ABS ratio decrease determination threshold value N is used to determine whether the ABS ratio is to be changed from N/8 to (N−1)/8. The value of the threshold value is a specific numerical value for comparison with the number of RLFs. The ABS ratio decrease determination threshold value increases as it changes from the ABS ratio decrease determination threshold value 1 to the ABS ratio decrease determination threshold value N.

In this case, the ABS ratio decrease determination threshold value is set to be given hysteresis so as not to cause ping-pong phenomenon with the processing in step S201. More specifically, in step S201, the ABS ratio is changed and increased, and thereafter, when the processing of FIG. 7 is executed, the ABS ratio is not changed and decreased in step S203 in response to a slight change in the number of RLFs, and accordingly, the ABS ratio decrease determination threshold value is set. For example, the ABS ratio decrease determination threshold value N may be set to be a smaller value that the ABS ratio increase determination threshold value N, or the ABS ratio decrease determination threshold value and the ABS ratio increase determination threshold value may be set to be the same value, and may not be set with hysteresis.

Subsequently, the decrease processing of the ABS ratio in step S203 of FIG. 7 will be explained in details with reference to FIG. 12. First, the radio resource control unit 132 determines whether the currently applied ABS ratio is "ABS ratio N/8" or not (S401). When the ABS ratio is "ABS ratio N/8", step S404 is subsequently performed, and if not, step S402 is subsequently performed. In step S404, the radio resource control unit 132 compares the number of RLFs notified by the micro base station 120 and the "ABS ratio decrease determination threshold value N", and when the number of RLFs is less than the ABS ratio decrease determination threshold value N, the ABS ratio is set to "ABS ratio (N−1)/8" (S407). When the number of RLFs is not less than the ABS ratio decrease determination threshold value N, the radio resource control unit 132 terminates the processing without changing the ABS ratio.

In step S402, the radio resource control unit 132 determines whether the currently applied ABS ratio is "ABS ratio (N−1)/8" or not, and when the currently applied ABS ratio is "ABS ratio (N−1)/8", step S405 is executed. In step S405, like step S404, the radio resource control unit 132 compares the number of RLFs notified by the micro base station 120 and "ABS ratio decrease determination threshold value (N−1)". When the number of RLFs is less than the ABS ratio decrease determination threshold value (N−1), the radio resource control unit 132 sets the ABS ratio to "ABS ratio (N−2)/8" (S408). In a case where the number of RLFs is more than the ABS ratio decrease determination threshold value (N−1), the radio resource control unit 132 terminates the processing without changing the ABS ratio.

When the currently applied ABS ratio is not "ABS ratio (N−1)/8" in step S402, the radio resource control unit 132 likewise performs the change determination of the ABS ratio in accordance with the currently applied ABS ratio, and as necessary, the radio resource control unit 132 makes determination up to "ABS ratio 1/8" as shown in step S403. For example, between step 402 and step S403, determination processing may be executed to determine whether the currently applied ABS ratio is "ABS ratio 2/8", "ABS ratio 3/8", "ABS ratio 4/8", "ABS ratio 5/8", "ABS ratio 6/8", "ABS ratio 7/8", "ABS ratio 8/8", or not. When the currently set ABS ratio is the minimum "ABS ratio 1/8" in step S403, step S406 is subsequently performed, and when the currently set ABS ratio is not "ABS ratio 1/8" (i.e., ABS OFF), the processing is terminated without performing the change determination of ABS. In step S406, like step S404 and S405, the number of RLFs notified by the micro base station 120 and "ABS ratio decrease determination threshold value 1" are compared, and when the number of RLFs is less than a threshold value, the ABS is set to OFF (S409). Otherwise, the processing is terminated without changing the ABS ratio.

Back to FIG. 7, lastly, in step S204, the macro base station 120 controls the data transmission in accordance with the calculated ABS ratio.

In this case, in FIG. 7, the increase processing of the ABS ratio is carried out in step S201, and thereafter, the decrease processing of the ABS ratio is carried out in step S203. For example, the decrease processing of the ABS ratio is carried out, and thereafter, the increase processing of the ABS ratio is carried out.

As explained above, by using the micro base station 120 and the macro base station 130 according to the second exemplary embodiment, the ABS ratio can be determined on the basis of the number of RLFs when the ABS is applied in the HetNet environment. Therefore, for example, in a case where the number of RLFs is more than a threshold value, change setting for, e.g., increasing the ABS ratio, is performed. In such case, by increasing the ABS ratio, the effect of the interference against a communication terminal present in the picocell 105 or the expansion area 106 is decreased. Therefore, the number of RLFs can be decreased. More specifically, the ABS ratio is determined on the basis of the number of RLFs, so that the service effect due to the RLFs is reduced, and the ABS can be optimized.

In the second exemplary embodiment, the number of RLFs is used as a specific example of communication environment, but the same processing can be executed even when an estimated SINR value, a reference signal reception power (RSRP: Reference Signal Received Power), a reference signal reception quality (RSRQ: Reference Signal Received Quality), and the like are used.

(Third Exemplary Embodiment)

Subsequently, a flow of detection processing of CQI distribution in the micro base station 120 according to the third exemplary embodiment will be explained with reference to FIG. 13.

Hereinafter, in the explanation about FIGS. 13 to 16, the portions where the number of RLFs has been explained in the second exemplary embodiment are replaced with the distribution of CQI.

A communication terminal present in the picocell 105 or the expansion area 106 measures CQI, which is an index indicating the state of radio propagation environment, by using a reference signal transmitted from the micro base station 120. The communication quality detection unit 121 generates a CQI distribution by summarizing CQIs measured by multiple communication terminals.

Figure 6:
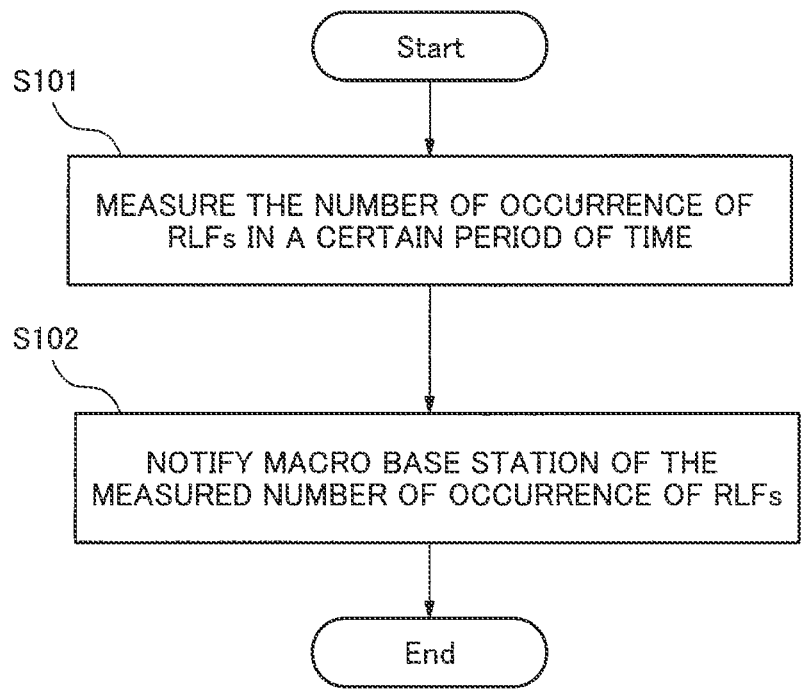
FIG. 6 is a figure for explaining a flow of processing for detecting the number of RLFs according to the second exemplary embodiment.
Figure 13:
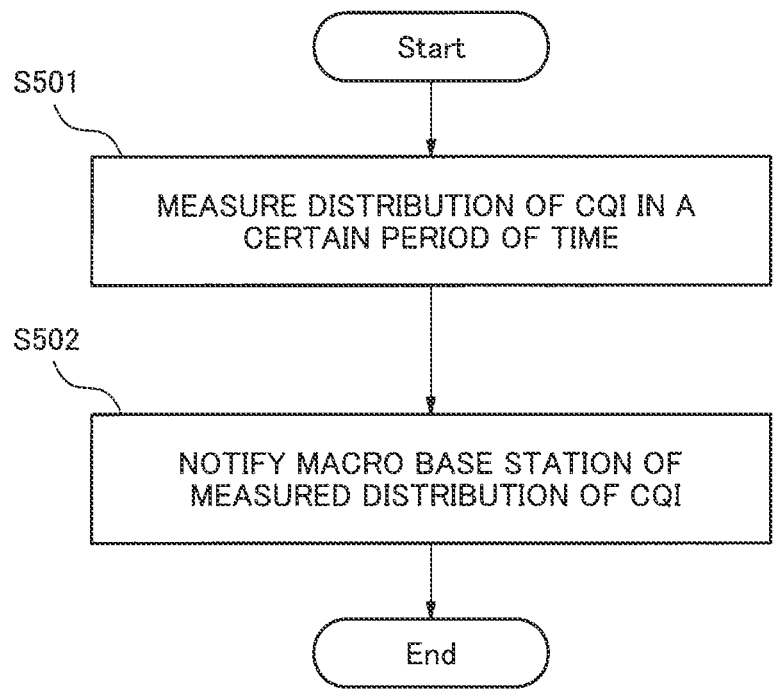
FIG. 13 is a figure for explaining a flow of measurement processing of CQI distribution according to a third exemplary embodiment.

In steps S501 and S502 of FIG. 13, the number of occurrence of RLFs in steps S101 and S102 of FIG. 6 is replaced with the CQI distribution, and the other contents are the same as steps S101 and S102 of FIG. 6. Therefore, the detailed explanation about steps S501 and S502 is omitted.

Figure 14:
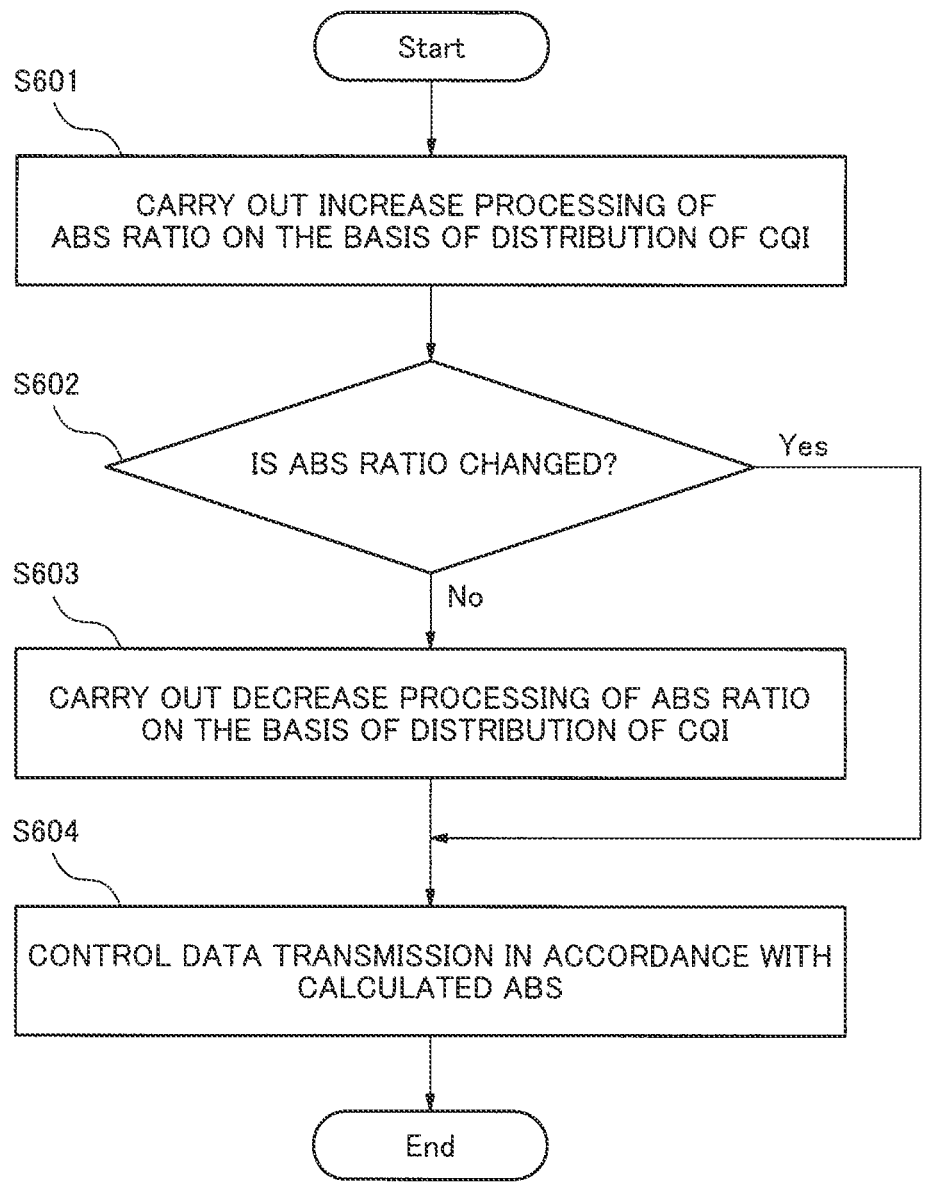
FIG. 14 is a figure for explaining a flow of control processing of a radio resource according to the third exemplary embodiment.

FIG. 14 illustrates a flow of radio resource control processing of the macro base station 130 according to the third exemplary embodiment. In steps S601 to S604 of FIG. 14, the number of occurrence of RLFs in steps S201 to S204 of FIG. 7 is changed to the CQI distribution, and the other contents are the same as steps S201 and S204 of FIG. 7. Therefore, the detailed explanation about steps S601 to S604 is omitted.

Subsequently, a flow of ABS ratio increase processing according to the third exemplary embodiment will be explained with reference to FIG. 15. In steps S701 to S709 of FIG. 15, the number of occurrence of RLFs in steps S301 to S309 of FIG. 7 is changed to a parameter about CQI distribution. In this case, the parameter about CQI distribution will be explained.

The radio resource control unit 132 compares the distribution of CQI and the ABS ratio increase determination threshold value in the ABS ratio increase processing, and therefore, the ABS ratio increase determination threshold value is a rate (%) indicating the ratio of the distribution. The ABS ratio increase determination threshold value becomes a larger value from the ABS ratio increase determination threshold value 1 to the ABS ratio increase determination threshold value N. Further, the radio resource control unit 132 uses a CDF (Cumulative Distribution Function), for those equal to or less than the value M of CQI defined in advance, as a parameter concerning the distribution of CQI compared with the ABS ratio increase determination threshold value.

Figure 15:
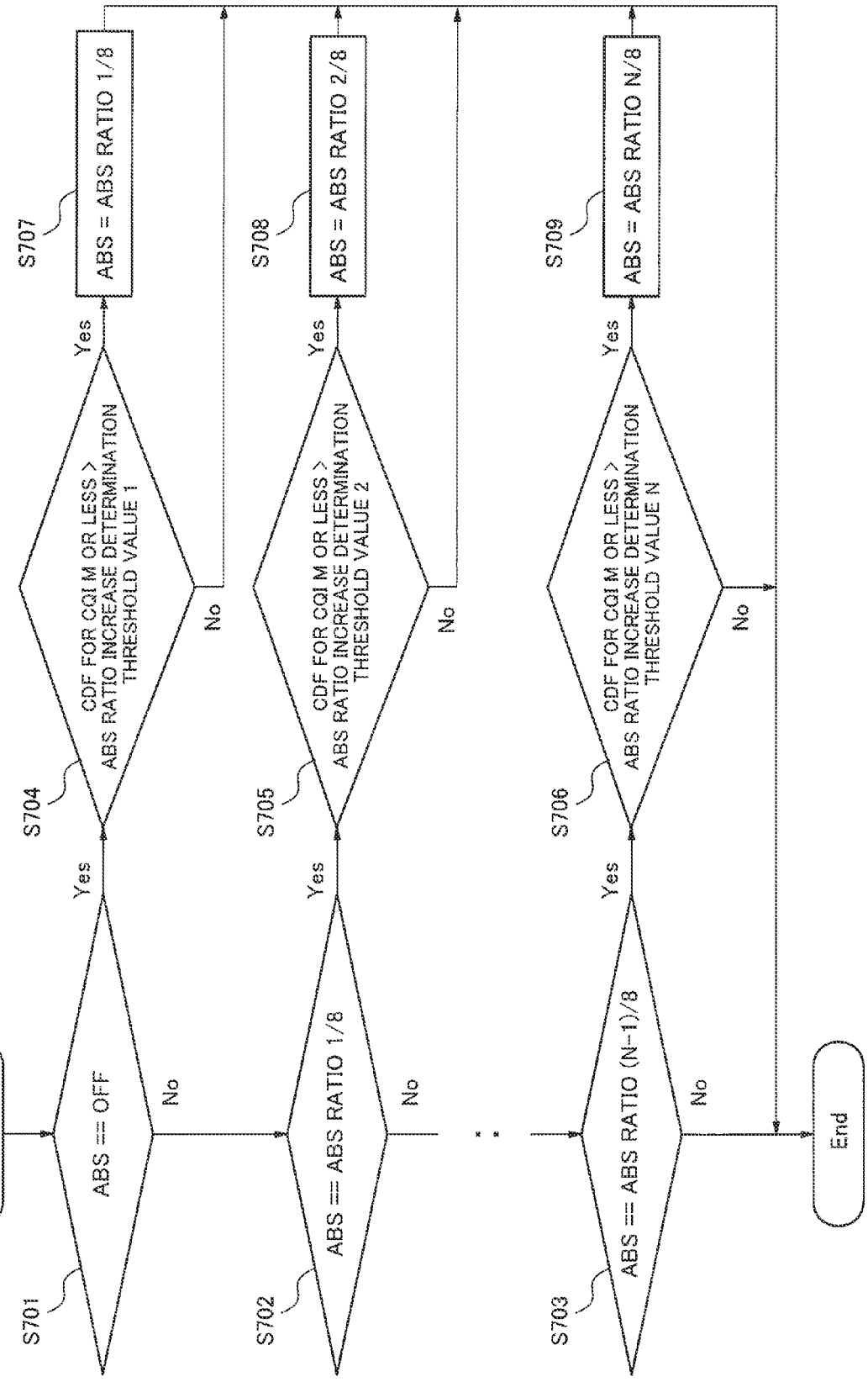
FIG. 15 is a figure for explaining a flow of ABS ratio increase processing according to the third exemplary embodiment.

Steps S701 to S709 of FIG. 15 are the same as steps S301 to S309 of FIG. 7 in the processing other than comparison between the CDF, for those equal to or less than CQI M, and the ABS ratio increase determination threshold value, and therefore, detailed explanation thereabout is omitted.

FIG. 16 illustrates a flow of ABS ratio decrease processing according to the third exemplary embodiment. Steps S801 to S809 of FIG. 16 are the same as steps S401 to S409 of FIG. 8 except that the number of occurrence of RLFs in steps S401 to S409 of FIG. 8 is changed to the parameter concerning the CQI distribution. The parameter concerning the CQI distribution is the same as what has been explained in FIG. 15. Therefore, detailed explanation in FIG. 16 is omitted.

As explained above, by using the micro base station 120 and the macro base station 130 according to the third exemplary embodiment, the ABS ratio can be determined on the basis of the distribution of the CQI when the ABS is applied in the HetNet environment. Therefore, for example, in a case where the CDF where CQI is equal to or less than M is more than a threshold value, change setting for, e.g., increasing the ABS ratio, is performed. In such case, by increasing the ABS ratio, the effect of the interference against a communication terminal present in the picocell 105 or the expansion area 106 is decreased. Therefore, the distribution where CQI is equal to or less than M can be decreased. More specifically, the ABS ratio is determined on the basis of the distribution of CQI, so that the radio environment of the picocell 105 and the expansion area 106 is improved, and the ABS can be optimized.

In the third exemplary embodiment, the distribution of CQI is used as a specific example of communication environment, but the same processing can also be executed by using a distribution of MCS (Modulation and Coding Scheme).

In the above exemplary embodiments, the exemplary embodiments are explained as a configuration of hardware, but the exemplary embodiments are not limited thereto. The exemplary embodiments can also be achieved by causing a CPU (Central Processing Unit) to execute a computer program to perform the processing of the micro base station 120, the macro base station 130, and the management apparatus 110.)

In the above example, the program is stored using various types of non-transitory computer readable media (non-transitory computer readable media), and can be provided to a computer. The non-transitory computer readable media include various types of tangible storage media (tangible storage media). Examples of non-transitory computer readable media include magnetic recording media (for example, a flexible disk, a magnetic tape, and a hard disk drive), a magneto-optical recording medium (for example, a magneto-optical disk), a C CD-ROM (Read Only Memory), a CD-R, a CD-R/W, a semiconductor memory (for example, a mask ROM, a PROM (Programmable ROM), an EPROM (Erasable PROM), a flash ROM, and a RAM (random access memory)). The program may be provided to a computer with various types of transitory computer-readable media (transitory computer readable media). Examples of transitory computer readable media include an electric signal, an optical signal, and an electromagnetic wave. The transitory computer readable medium can provide a program to a computer via a wire communication path such as an electric wire and an optical fiber, or a wireless communication path.

It should be noted that the present invention is not limited to the above exemplary embodiment, and can be changed as necessary within the scope not deviating from the gist. Various changes that could be understood by a person skilled in the art within the scope of the invention of the present application can be applied to the configuration and the details of the invention of the present application.

(Supplementary Note)

A part or all of the above exemplary embodiments can also be described as shown in the following Supplementary notes. However, each of the following Supplementary notes is merely an example of the present invention, and the present invention is not limited to such cases.

(Supplementary Note 1)

A radio control system including a first base station forming a first communication area, a second base station forming a second communication area included in the first communication area, and radio resource control means controlling a limitation of usage of a radio resource in the first base station, on the basis of a communication quality.

(Supplementary Note 2)

The radio control system according to Supplementary note 1, wherein in a case where the first base station executes processing for increasing the ratio of the radio resource where its usage is limited, and the communication quality is determined to be worse than a first communication quality defined in advance, the radio resource control means increases the ratio of the radio resource where its usage is limited in the first base station.

(Supplementary Note 3)

The radio control system according to Supplementary note 1 or Supplementary note 2, wherein in a case where the first base station executes processing for decreasing the ratio of the radio resource where its usage is limited, and the communication quality is determined to be better than a second communication quality defined in advance, the radio resource control means decreases the ratio of the radio resource where its usage is limited in the first base station.

(Supplementary Note 4)

The radio control system according to any one of Supplementary notes 1 to 3, wherein hysteresis is given between a threshold value of the communication quality used for determining whether to increase the ratio of the radio resource where its usage is limited in the first base station is limited and a threshold value of the communication quality used for determining whether to decrease the ratio of the radio resource where its usage is limited in the first base station is limited (Supplementary Note 5)

The radio control system according to any one of Supplementary notes 1 to 4, wherein a control of limitation of usage of the radio resource in the first base station is performed by controlling a pattern of ABS.

(Supplementary Note 6)

The radio control system according to any one of Supplementary notes 1 to 5, wherein the communication quality detection means detects, as the communication quality, at least one of a number of occurrence of Radio Link Failure (RLF), a Channel Quality Indicator (CQI) distribution, a Signal to Interference and Noise power Ratio (SINR) value, and a Modulation and Coding Scheme (MCS) distribution.

(Supplementary Note 7)

A communication apparatus including a radio resource control unit controlling a limitation of usage of a radio resource in a first base station, on the basis of a communication quality with a communication terminal present in a second communication area included in a first communication area formed by the first base station.

(Supplementary Note 8)

The communication apparatus according to Supplementary note 7 further including a communication quality detection unit detecting, as the communication quality, at least one of a number of occurrence of Radio Link Failure (RLF), a Channel Quality Indicator (CQI) distribution, a Signal to Interference and Noise power Ratio (SINR) value, and a Modulation and Coding Scheme (MCS) distribution.

(Supplementary Note 9)

The communication apparatus according to Supplementary note 7 or 8, wherein in a case where processing for increasing the ratio of the radio resource where its usage is limited is executed, and the communication quality is determined to be worse than a first communication quality defined in advance, the radio resource control unit increases the ratio of the radio resource where its usage is limited.

(Supplementary Note 10)

The communication apparatus according to any one of Supplementary notes 7 to 10, wherein in a case where processing for decreasing the ratio of the radio resource where its usage is limited is executed, and the communication quality is determined to be better than a second communication quality defined in advance, the radio resource control unit decreases the ratio of the radio resource where its usage is limited.

(Supplementary Note 11)

The communication apparatus according to Supplementary note 10, wherein in a case where the ratio of the radio resource where its usage is limited is not changed in the processing for increasing the ratio of the radio resource where its usage is limited, the radio resource control unit executes processing for decreasing the ratio of the radio resource where its usage is limited, or in a case where the ratio of the radio resource where its usage is limited is not changed in the processing for decreasing the ratio of the radio resource where its usage is limited, the radio resource control unit executes processing for increasing the ratio of the radio resource where its usage is limited (Supplementary Note 12)

A radio resource control method controlling a ratio of a radio resource in a first base station, on the basis of a communication quality with a communication terminal present in a second communication area included in a first communication area formed by the first base station.

(Supplementary Note 13)

A program for causing a computer to execute a step of controlling a limitation of usage of a radio resource in the first base station, on the basis of a communication quality with a communication terminal present in a second communication area included in a first communication area formed by the first base station.

(Supplementary Note 14)

A radio control system including
a first base station forming a first communication area;
a second base station forming a second communication area included in the first communication area;
a detection unit detecting a communication quality between the second base station and a communication terminal present in the second communication area; and
a control unit controlling a ratio of a radio resource where data transmission is limited in the first base station, on the basis of the communication quality.

(Supplementary Note 15)

The radio control system according to Supplementary note 14, wherein in a case where the communication quality is determined to be worse than a first communication quality defined in advance, the control unit increases the ratio of the radio resource where the data transmission is limited in the first base station.

(Supplementary Note 16)

The radio control system according to Supplementary note 14, wherein in a case where the communication quality is determined to be better than a second communication quality defined in advance, the control unit decreases the ratio of the radio resource where the data transmission is limited in the first base station.

(Supplementary Note 17)

The radio control system according to any one of Supplementary notes 14 to 16, wherein hysteresis is given between a threshold value of the communication quality used for determining whether to increase the ratio of the radio resource where the data transmission is limited in the first base station and a threshold value of the communication quality used for determining whether to decrease the ratio of the radio resource where the data transmission is limited in the first base station (Supplementary Note 18)

The radio control system according to any one of Supplementary notes 14 to 17, wherein a control of the ratio of the radio resource where the data transmission is limited in the first base station is performed by controlling a pattern of ABS.

(Supplementary Note 19)

The radio control system according to any one of Supplementary notes 14 to 18, wherein the detection unit detects, as the communication quality, at least one of a number of occurrence of Radio Link Failure (RLF), a Channel Quality Indicator (CQI) distribution, a Signal to Interference and Noise power Ratio (SINR) value, and a Modulation and Coding Scheme (MCS) distribution.

(Supplementary Note 20)

A communication apparatus including a control unit controlling a ratio of a radio resource where data transmission is limited in a first base station, on the basis of a communication quality with a communication terminal present in a second communication area included in a first communication area formed by the first base station.

(Supplementary Note 21)

The communication apparatus according to Supplementary note 20 further including a detection unit detecting, as the communication quality, at least one of a number of occurrence of Radio Link Failure (RLF), a Channel Quality Indicator (CQI) distribution, a Signal to Interference and Noise power Ratio (SINR) value, and a Modulation and Coding Scheme (MCS) distribution.

(Supplementary Note 22)

A radio resource control method controlling a ratio of a radio resource where data transmission is limited in a first base station, on the basis of a communication quality with a communication terminal present in a second communication area included in a first communication area formed by the first base station.

(Supplementary Note 23)

A recording medium recorded with a program for causing a computer to execute controlling a ratio of a radio resource where data transmission is limited in a first base station, on the basis of a communication quality with a communication terminal present in a second communication area included in a first communication area formed by the first base station.

(Supplementary Note 24)

A communication apparatus including a control unit controlling a radio resource where data transmission is limited in a first base station, on the basis of a communication quality with a communication terminal present in a second communication area included in a first communication area formed by the first base station.

(Supplementary Note 25)

A communication apparatus including a control unit controlling a setting of a radio resource where data transmission is limited in a first base station, on the basis of a communication quality with a communication terminal present in a second communication area included in a first communication area formed by the first base station.

(Supplementary Note 26)

A communication apparatus including a control unit controlling allocation of a radio resource where data transmission is limited in a first base station, on the basis of a communication quality with a communication terminal present in a second communication area included in a first communication area formed by the first base station.

This application claims the priority based on Japanese Patent Application No. 2013-148546 filed on Jul. 17, 2013, and the entire disclosure thereof is incorporated herein by reference.

REFERENCE SIGNS LIST 101 macro base station
102 micro base station
103 macro cell
104 communication interface
105 picocell
106 expansion area
110 management apparatus
111 communication quality detection unit
112 radio resource control unit
120 micro base station
121 communication quality detection unit
122 communication unit
130 macro base station
131 communication unit
132 radio resource control unit

The invention claimed is:

1. A radio control system comprising:
a first base station forming a first communication area;
a second base station forming a second communication area included in the first communication area;
a detection unit that detects a communication quality between the second base station and a communication terminal present in the second communication area; and
a control unit that controls a ratio of a radio resource where data transmission is limited in the first base station, based on the communication quality,
wherein the detection unit detects, as the communication quality, a number of occurrences of Radio Link Failure (RLF).

2. The radio control system according to claim 1, wherein in a case where the communication quality is determined to be worse than a first communication quality defined in advance, the control unit increases the ratio of the radio resource where the data transmission is limited in the first base station.

3. The radio control system according to claim 2, wherein hysteresis is given between a threshold value of the communication quality used for determining whether to increase the ratio of the radio resource where the data transmission is limited in the first base station and a threshold value of the communication quality used for determining whether to decrease the ratio of the radio resource where the data transmission is limited in the first base station.

4. The radio control system according to claim 3, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

5. The radio control system according to claim 2, wherein a control of the ratio of the radio resource where the data transmission is limited in the first base station is performed by controlling a pattern of Almost Blank Subframe (ABS).

6. The radio control system according to claim 2, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

7. The radio control system according to claim 1, wherein in a case where the communication quality is determined to be better than a second communication quality defined in advance, the control unit decreases the ratio of the radio resource where the data transmission is limited in the first base station.

8. The radio control system according to claim 7, wherein hysteresis is given between a threshold value of the communication quality used for determining whether to increase the ratio of the radio resource where the data transmission is limited in the first base station and a threshold value of the communication quality used for determining whether to decrease the ratio of the radio resource where the data transmission is limited in the first base station.

9. The radio control system according to claim 7, wherein a control of the ratio of the radio resource where the data transmission is limited in the first base station is performed by controlling a pattern of Almost Blank Subframe (ABS).

10. The radio control system according to claim 7, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

11. The radio control system according to claim 1, wherein hysteresis is given between a threshold value of the communication quality used for determining whether to increase the ratio of the radio resource where the data transmission is limited in the first base station and a threshold value of the communication quality used for determining whether to decrease the ratio of the radio resource where the data transmission is limited in the first base station.

12. The radio control system according to claim 11, wherein a control of the ratio of the radio resource where the data transmission is limited in the first base station is performed by controlling a pattern of Almost Blank Subframe (ABS).

13. The radio control system according to claim 11, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

14. The radio control system according to claim 1, wherein a control of the ratio of the radio resource where the data transmission is limited in the first base station is performed by controlling a pattern of Almost Blank Subframe (ABS).

15. The radio control system according to claim 14, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

16. The radio control system according to claim 1, wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

17. A communication apparatus comprising control unit that controls a ratio of a radio resource where data transmission is limited in a first base station, based on a communication quality with a communication terminal present in a second communication area included in a first communication area formed by the first base station, and a detection unit that detects, as the communication quality, a number of occurrences of Radio Link Failure (RLF).

18. The communication apparatus according to claim 17 wherein the detection unit detects, as the communication quality, at least one of a Channel Quality Indicator (CQI) distribution, a Signal to Interference and Noise power Ratio (SINR) value, and a Modulation and Coding Scheme (MCS) distribution.

19. A radio resource control method comprising:
    detecting, as a communication quality, a number of occurrences of Radio Link Failure (RLF); and
    controlling a ratio of a radio resource where data transmission is limited in a first base station, based on the communication quality with a communication terminal present in a second communication area included in a first communication area formed by the first base station.

20. A non-transitory computer-readable computer medium storing a program for causing a computer to execute:
    controlling a ratio of a radio resource where data transmission is limited in a first base station, based on a communication quality with a communication terminal present in a second communication area included in a first communication area formed by the first base station; and
    detecting, as the communication quality, a number of occurrences of Radio Link Failure (RLF).

* * * * *